United States Patent [19]

Rosenzweig

[11] Patent Number: 4,931,116
[45] Date of Patent: Jun. 5, 1990

[54] HEAT-RECOVERABLE COUPLER

[75] Inventor: Nachum Rosenzweig, Palo Alto, Calif.

[73] Assignee: Raychem Corporation, Menlo Park, Calif.

[21] Appl. No.: 89,389

[22] Filed: Aug. 25, 1987

Related U.S. Application Data

[63] Continuation-in-part of Ser. No. 867,830, May 27, 1986, abandoned.

[30] Foreign Application Priority Data

May 26, 1987 [EP] European Pat. Off. ........ 87304621.3

[51] Int. Cl.$^5$ .............................................. B32B 31/26
[52] U.S. Cl. ........................................ 156/85; 156/86; 156/158; 264/230; 264/342 R; 285/381; 285/423; 219/535; 219/544
[58] Field of Search ............ 156/49, 86, 273.9, 274.4, 156/304.3, 158, 84, 85; 264/27, 105, 230, 263, 271.1, DIG. 46, DIG. 71, DIG. 76, 342 R; 285/381, 423; 219/528, 535, 544; 174/DIG. 8

[56] References Cited

U.S. PATENT DOCUMENTS

| | | | |
|---|---|---|---|
| 4,085,286 | 4/1978 | Horsma et al. | 174/92 |
| 4,135,743 | 1/1979 | Hughes | 285/115 |
| 4,177,376 | 12/1979 | Horsma | 219/548 |
| 4,177,446 | 12/1979 | Diaz | 219/528 |
| 4,304,616 | 12/1981 | Richardson | 174/DIG. 8 |
| 4,323,607 | 4/1982 | Nishimura et al. | 156/84 |
| 4,375,591 | 3/1983 | Sturm | 219/535 |
| 4,378,323 | 3/1983 | Brandeau | 264/27 |
| 4,419,304 | 12/1983 | Ficke et al. | 264/25 |
| 4,421,582 | 12/1983 | Horsma | 156/86 |
| 4,570,055 | 2/1986 | McMills | 219/541 |
| 4,575,618 | 3/1986 | Rosenzweig | 219/535 |
| 4,670,078 | 6/1987 | Thalmann et al. | 219/535 |
| 4,681,985 | 7/1987 | Katz et al. | 174/DIG. 8 |
| 4,686,071 | 8/1987 | Rosenzweig et al. | 156/86 |
| 4,727,242 | 2/1988 | Barfield | 219/544 |
| 4,775,501 | 10/1988 | Rosenzweig et al. | 264/27 |

FOREIGN PATENT DOCUMENTS 0157640 9/1985 European Pat. Off. .

*Primary Examiner*—Calleb Weston
*Attorney, Agent, or Firm*—Timothy H. P. Richardson; Herbert G. Burkard

[57] ABSTRACT

A coupler for joining polymeric pipes comprises a generally cylindrical radially heat-shrinkable member which is composed of a conductive polymer. To recover the coupler, current is passed axially through the coupler via electrodes. The coupler has a center portion of increased wall thickness and in this way, when there is a gap between the pipes, overheating of the center portion of the coupler is avoided.

19 Claims, 1 Drawing Sheet

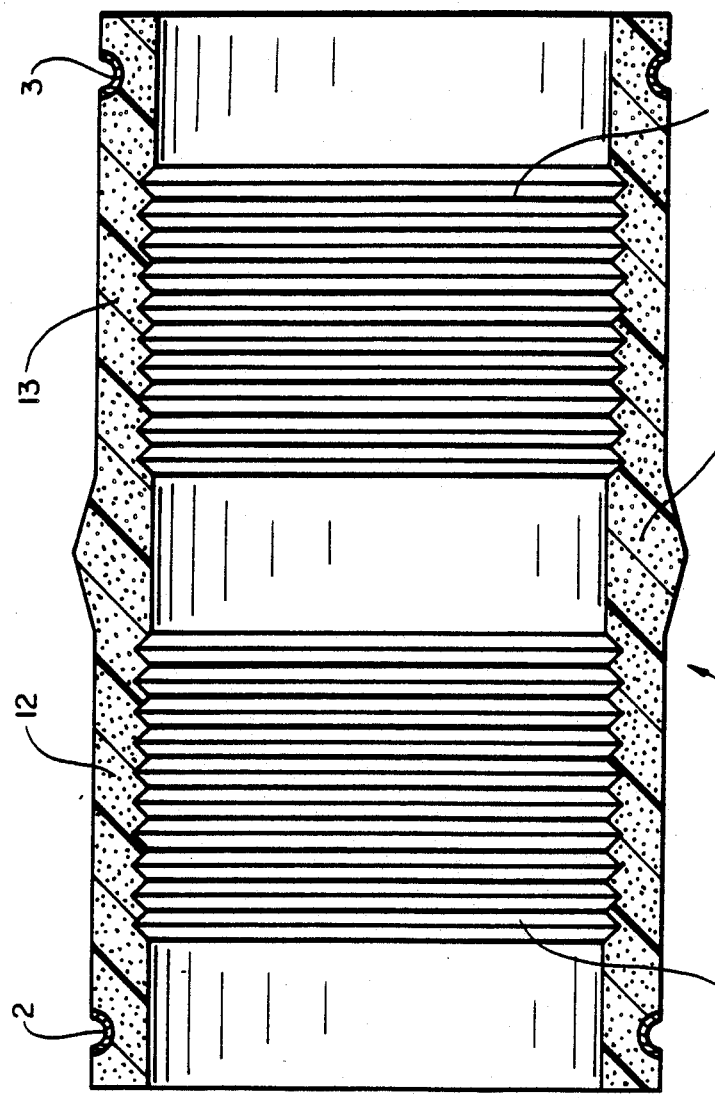

HEAT-RECOVERABLE COUPLER

CROSS-REFERENCE TO RELATED APPLICATION

This application is a continuation-in-part of my copending commonly assigned application Ser. No. 867,830 filed May 27, 1986 now abandoned, the disclosure of which is incorporated herein by reference.

BACKGROUND OF THE INVENTION

1. Field of the Invention

This invention relates to heat-recoverable devices and their use for joining pipes.

2. Introduction to the Invention

It is known that heat-recoverable devices can be used to repair, reinforce, join or otherwise modify substrates of many kinds. It is also known that such devices can comprise a heating element which is composed of a conductive polymer and which, when connected to a suitable power source, will generate heat and cause recovery of the device. The heating element can itself be heat-recoverable. Reference may be made, for example, to U.S. Pat. Nos. 4,085,286, 4,177,376, 4,177,446, 4,421,582, 4,570,055 and 4,575,618 and to copending commonly assigned U.S. patent applications Ser. Nos. 582,105 (MP0907), now abandoned in favor of continuation application Ser. No. 132,698, 634,242, (MP0949), now U.S. Pat. No. 4,686,071, 720,117 (MP0922-US2) now U.S. Pat. No. 4,775,501 and 720,118 (MP1039), and 853,805 (MP1117) now abandoned. The disclosure of each of the patents and patent applications referred to above is incorporated herein by reference.

SUMMARY OF THE INVENTION

It has been found that when polymeric pipes are joined together by means of a heat-shrinkable coupling member which is composed of a conductive polymer and which becomes fused to the pipes (in particular as described in U.S. Pat. No. 4,775,501), serious and unexpected problems can arise if there is a gap between the ends of the pipes to be joined; a relatively large gap is often present in practical installations, because the pipes are not cut precisely to length and cannot be butted against each other and/or because the ends of the pipes are not cut square. These problems are particularly severe when (a) the pipes are large ones (e.g. of external diameter greater than 3 inch, particularly greater than 5 inch), (b) when the wall thickness of the coupler is small compared to its diameter (e.g. the ratio of the internal diameter of the coupler to its wall thickness is at least 5:1, particularly at least 8:1), (c) when no internal support member is used, and (d) when there is pressurized gas within one or both of the pipes to be joined.

I have now discovered that these problems can be simply and effectively solved by modifying the center portion of the coupler, which overlies the ends of the pipes and any gap between them, so that it is heated to a lower temperature, though of course to a temperature which is still high enough to cause it to shrink. The modification is preferably such that when current is passed axially through the coupler, the resistance of the center portion is reduced. Preferably the conductive polymer composition is the same throughout the coupler and the modification is an increase in the wall thickness of the center portion. Alternatively or additionally, the concentration of the conductive filler can be increased in the center portion.

In one aspect, the present provides a heat-shrinkable coupler which is suitable for joining two pipes, at least one of said pipes having at least an outer surface composed of a heat-softenable composition comprising an organic polymer, and which comprises (1) a generally cylindrical radially heat-shrinkable member which is composed of a conductive polymer and which comprises
   (a) a first axially-extending portion;
   (b) a second axially-extending portion; and
   (c) a third axially-extending portion;
   the second portion lying between the first and third portions; and
(2) electrodes which can be connected to a source of electrical power;

the coupler being such that when the electrodes are connected to a suitable power source, in the absence of any pipes, current passes through the heat-shrinkable member, thus heating the member until the coupler shrinks, and the maximum temperature reached by the outside surface of the second portion is less than the maximum temperatures reached by the outside surfaces of the first and third portions.

In another aspect, the present invention provides a method of joining two pipes composed of a heat-softenable polymeric composition, which method comprises (1) placing the pipes within a coupler as defined above, with the ends of the pipes within the second portion; and
(2) passing current through the coupler so that it shrinks into contact with the pipes and the first and third portions become fused to the respective pipes.

BRIEF DESCRIPTION OF THE DRAWING

The invention is illustrated in the accompanying drawing in which the FIGURE is a cross-section through a generally cylindrical coupler of the invention.

DETAILED DESCRIPTION OF THE INVENTION

In the method of the invention, the center portion does not get as hot as it would in a comparable conventional coupler in which the center portion had not been modified. In such a conventional coupler, the center portion generates the same amount of heat per unit volume as the adjacent portions, but gets substantially hotter because the heat per unit volume which it loses to the pipes and to the environment is less than the amount of heat per unit volume which is lost to the pipes and the environment by the adjacent portions. This overheating can have serious adverse consequences. Thus the polymer may become degraded, particularly if the coupling operation is carried out in air (as is normally the case) and/or if the pipes contain air or another gas which accelerates such degradation. Furthermore if one of the pipes contains gas under pressure (even if it is only a small leakage from a pipe which is supposed to have been disconnected), then as soon as the adjacent portions have sealed to the pipes, the internal gas pressure can cause the unsupported and overheated center portion to balloon outwards, rendering the joint substantially weaker or even useless. The couplers of the invention do not suffer from this disadvantage. Furthermore, when, as is preferred, the center portion is of greater wall thickness, it will have (after the coupler has cooled and the pipe is in service) better resistance to deformation, e.g. in long term pressure testing, than a conventional, relatively thin, unsupported center portion, particularly one that has been overheated, and thus degraded, during its installation.

The first and third portions adjacent the second center portion are typically of substantially constant wall thickness, and may be provided with small internal circumferential or helical ribs to assist in bonding to the pipes. The center portion is preferably free from such ribs, in order to reduce the surface area exposed to oxidation and to avoid stress concentration. The center portion is modified so as to prevent deleterious overheating, preferably by increasing its wall thickness, thus reducing its electrical resistance in the axial direction. The increase in wall thickness can be achieved by increasing the outer diameter of the center portion or decreasing its inner diameter, or both. The change in inner and/or outer diameter is preferably a gradual change, to avoid abrupt changes in current density which would give rise to localized overheating or inadequate heating during coupling, and to avoid the presence of stress risers which might initiate cracking in the finished coupling.

When the first and third portions are of substantially constant wall thickness, and the center portion is of greater wall thickness, then there will be no difficulty in identifying the first, second and third portions of the coupler. However, the identification of the different portions may not always be immediately apparent, for example if the coupler has a continuously varying wall thickness or the temperature reached by the different parts of the coupler is controlled in some other way. Under such circumstances, if it is necessary to identify the different portions, for example in order to apply the preferred quantitative measures set out below, the second (center) portion is defined herein as the center 15% of the total length of the coupler; and the first and third portions are defined as the adjacent portions in which, when the coupler is caused to recover (in the absence of any pipes) by passing current through the heat-recoverable member, the temperature reached is at least as high as it is at the junction with the center portion; thus in a coupler in which the wall thickness controls the temperature, the first and third portions are the adjacent portions in which the wall thickness is no greater than the wall thickness at the junction with the center portion.

When the first and third portions are of uniform wall thickness, the maximum wall thickness of the center portion is preferably at least 1.1 times, particularly at least 1.15 times, the wall thickness of the first and third portions. The ratio of the arithmetic average wall thickness of the center portion to the arithmetic average wall thickness of the first and third portions (which in this case may be of uniform or non-uniform wall thickness) is preferably greater than 1, particularly at least 1.05, especially at least 1.075. The ratio of the axial length of each of the first and third portions to the axial length of the center portion is preferably 2:1 to 6:1, particularly 2:1 to 5:1, especially 2.5:1 to 4:1. In each of the first and third portions, the ratio of the internal diameter to the average wall thickness is preferably at least 5:1, particularly at least 8:1.

The outer ends of the first and third portions can also be the open ends of the coupler, or the coupler can comprise end portions of increased wall thickness as described and claimed in U.S. Ser. No. 853,805, now abandoned incorporated herein by reference.

When a coupler of the invention is used to join pipes, the maximum temperature reached by the external surface of the thickest part of the second portion is less than, preferably at least 20° C. below, the maximum temperature reached by the external surfaces of the first and third portions. The internal surface of the second portion may be above or below the temperature required for fusion to the pipes, but the external surface must remain at a low enough temperature to ensure the structural integrity of the center portion.

Referring now to the drawing, this illustrates a coupler which comprises a generally cylindrical radially heat-shrinkable member 1 which is composed of a sintered conductive polymer, preferably a sintered mixture of carbon black and ultra high molecular weight polyethylene, and circumferential electrodes 2 and 3. The member 1 has a center portion 11 of increased wall thickness, and adjacent portions 12 and 13 which are of substantially constant wall thickness. Ribs 14 are formed on the interior surface of portions 12 and 13, their size being, however, exaggerated in the drawing.

The invention is further illustrated by the following Example.

EXAMPLE

A coupler as illustrated in the drawing was made as follows. First, a cylindrical blank was obtained by sintering (at 230° C. for 4 hours) a dry blend of 93 parts by volume of ultra high molecular weight polyethylene (Hostalen GUR-413 available from American Hoechst) and 7 parts by volume of carbon black (Ketjenblack EC, available from Akzo Chemie). This blank was machined to the shape shown with an internal diameter of about 16 cm (6.3 inch), heated to 135° C., expanded to an inner diameter of 17.8 cm (7 inch), and cooled in the expanded state. The grooves at the ends of the couplers were painted with a conductive paint to provide the electrodes.

The coupler was used to join two pieces of 15.25 cm (6 inch) IPS Driscopipe 8000 polyethylene pipe, whose ends were placed inside the pipe about 0.6 cm (0.25 inch) apart. The coupler was connected to a 40 volt power supply (via copper wire electrodes placed in the grooves) for about 24 minutes. The maximum temperature reached by the outside surface of the coupler at the center of each ribbed portion was about 225° C., while the maximum temperature reached by the outside surface of the coupler at the center of the center portion was about 190° C.

I claim:
1. A heat-shrinkable coupler which is suitable for joining two pipes, and which comprises
   (1) a generally cylindrical radially heat-shrinkable member which is composed of a conductive polymer and which comprises
      (a) a first axially-extending portion;
      (b) a second axially-extending portion; and
      (c) a third axially-extending portion;
      the second portion lying between the first and third portions; and
   (2) electrodes which can be connected to a source of electrical power;
the coupler being such that when the electrodes are connected to a suitable power source, in the absence of any pipes, current passes through the heat-shrinkable member, thus heating the member until the coupler shrinks, and the maximum temperature reached by the outside surface of the second portion is less than the maximum temperatures reached by the outside surfaces of the first and third portions.

2. A coupler according to claim 1 wherein the current passes axially through the heat-shrinkable member and the arithmetic average wall thickness of the second portion is at least 1.05 times the arithmetic average wall thickness of the first and third portions.

3. A coupler according to claim 1 which consists essentially of the heat-shrinkable member and the electrodes, and wherein the conductive polymer is the same throughout the heat-shrinkable member, the current passes axially through the heat-shrinkable member, and the arithmetic average wall thickness of the second portion is at least 1.075 times the arithmetic average wall thickness of the first and third portions.

4. A coupler according to claim 1 which consists essentially of the heat-shrinkable member and the electrodes, and wherein the current passes axially through the heat-shrinkable member, the first and third portions have a substantially constant wall thickness and the second portion has a maximum wall thickness which is at least 1.1 times the first wall thickness.

5. A coupler according to claim 4 wherein the second portion has a maximum wall thickness which is at least 1.15 times the first wall thickness.

6. A coupler according to claim 1 wherein the conductive polymer composition is one obtained by sintering a mixture of polymer particles and conductive particles.

7. A coupler according to claim 1 wherein the conductive polymer composition is one obtained by sintering a mixture of ultra high molecular weight polyethylene and carbon black.

8. A coupler according to claim 2 wherein in each of the first and third sections, the ratio of the internal diameter to the average wall thickness is at least 5:1.

9. A coupler according to claim 4 wherein in each of the first and third sections, the ratio of the internal diameter to the average wall thickness is at least 8:1.

10. A coupler according to claim 1 wherein the ratio of the axial length of each of the first and third portions to the axial length of the second portion is 2:1 to 6:1.

11. A coupler according to claim 2 wherein the ratio of the axial length of each of the first and third portions to the axial length of the second portion is 2.5:1 to 4:1.

12. A method of joining two pipes composed of a heat-softenable polymeric composition, which method comprises
 (1) placing the pipes within a coupler which comprises
  (a) a generally cylindrical radially heat-shrinkable member which is composed of a conductive polymer and which comprises
   (i) a first axially-extending portion;
   (ii) a second axially-extending portion; and
   (iii) a third axially-extending portion;
   the second portion lying between the first and third portions and the arithmetic average wall thickness of the second portion being at least 1.05 times the arithmetic average wall thickness of the first and third portions; and
  (b) electrodes which can be connected to a source of electrical power;
 the ends of the pipes being within the second portion, and the coupler being such that when the electrodes are connected to a suitable power source, in the absence of any pipes, current passes axially through the heat-shrinkable member, thus heating the member until the coupler shrinks, and the maximum temperature reached by the outside surface of the second portion is less than the maximum temperature reached by the outside surfaces of the first and third portions; and
 (2) passing current through the coupler so that it shrinks into contact with the pipes and the first and third portions become fused to the respective pipes.

13. A method according to claim 12 wherein the maximum temperature reached by the external surface of the thickest part of the second portion is at least 20° C. below the maximum temperature reached by the external surfaces of the first and third portions.

14. A method according to claim 12 wherein the coupler consists essentially of the heat-shrinkable member and the electrodes, the first and third portions have substantially constant wall thickness and the second portion has a maximum wall thickness which is at least 1.1 times the first wall thickness.

15. A method according to claim 14 wherein the conductive polymer is one obtained by sintering a mixture of ultra high molecular weight polyethylene and carbon black.

16. A method according to claim 12 wherein in each of the first and third sections, the ratio of the internal diameter to the average wall thickness is at least 5:1.

17. A method according to claim 12 wherein the coupler consists essentially of the heat-shrinkable member and the electrodes; and the ratio of the axial length of each of the first and third portions to the axial length of the second portion is 2:1 to 6:1.

18. A method according to claim 12 wherein at least one of said pipes contains gas under pressure.

19. A method according to claim 12 wherein the coupler consists essentially of the heat-shrinkable member and the electrodes; the ratio of the axial length of the second portion to each of the first and third portions is 2.5:1 and 4:1; and in each of the first and third portions, the ratio of the internal diameter to the average wall thickness is at least 8:1.

* * * * *